(12) United States Patent
Griffith

(10) Patent No.: US 9,089,237 B1
(45) Date of Patent: Jul. 28, 2015

(54) COLLAPSIBLE COLANDER

(71) Applicant: Todd Griffith, Corsica, PA (US)

(72) Inventor: Todd Griffith, Corsica, PA (US)

( * ) Notice: Subject to any disclaimer, the term of this patent is extended or adjusted under 35 U.S.C. 154(b) by 290 days.

(21) Appl. No.: 13/766,739

(22) Filed: Feb. 13, 2013

Related U.S. Application Data

(60) Provisional application No. 61/599,405, filed on Feb. 15, 2012.

(51) Int. Cl.
```
A47J 19/00      (2006.01)
A47J 43/24      (2006.01)
A47J 36/20      (2006.01)
B01D 29/00      (2006.01)
```

(52) U.S. Cl.
CPC ............... *A47J 19/005* (2013.01); *A47J 43/24* (2013.01); *A47J 36/20* (2013.01); *B01D 23/08* (2013.01); *B01D 2201/02* (2013.01)

(58) Field of Classification Search
CPC ......... A47J 19/005; A47J 36/18; A47J 36/20; A47J 43/18; A47J 43/22; A47J 43/24; B01D 23/08
See application file for complete search history.

(56) References Cited

U.S. PATENT DOCUMENTS

| | | | | |
|---|---|---|---|---|
| 1,420,496 A | * | 6/1922 | Ohm | 416/73 |
| 1,594,023 A | * | 7/1926 | Sorenson | 210/485 |
| 3,009,235 A | * | 11/1961 | De Mestral | 428/86 |
| 4,138,939 A | | 2/1979 | Feld | |
| D316,505 S | | 4/1991 | Chow | |
| 6,019,244 A | | 2/2000 | Jones | |
| D558,536 S | | 1/2008 | Curtin | |
| D574,673 S | | 8/2008 | Tsui | |
| D595,997 S | | 7/2009 | Lee | |
| 7,678,271 B2 | | 3/2010 | Curtin | |
| D661,944 S | | 6/2012 | Davies | |
| 8,215,230 B2 | | 7/2012 | Curtin | |
| 2008/0011671 A1 | * | 1/2008 | Syrkos | 210/469 |
| 2008/0230462 A1 | | 9/2008 | Curtin | |

OTHER PUBLICATIONS

"Sleeve." Merriam-Webster.com. Merriam-Webster, n.d. Web. Jan. 22, 2015. <http://www.merriamwebster.com/dictionary/sleeve> (archival copy at http://web.archive.org/web/20100220204851/http://www.merriamwebster.com/dictionary/sleeve (Feb. 20, 2010)).*

* cited by examiner

*Primary Examiner* — Lucas Stelling
*Assistant Examiner* — Angel Olivera
(74) *Attorney, Agent, or Firm* — William F. Lang, IV; Lang Patent Law LLC

(57) ABSTRACT

A collapsible colander includes a bowl portion and a base portion. The bowl portion is made from a plurality of triangular panels that are pivotally secured together around a central pivot, and slidably joined two adjacent panels by sliding fasteners. Mating fastener components secured to the end panels permit the bowl to be assembled into a bowl shape. The base is a continuous band that is positioned in a generally circular configuration underneath of the bowl to support the bowl when the colander is in use. When the colander is collapsed, the collapsed bowl fits within the substantially flattened base.

12 Claims, 6 Drawing Sheets

COLLAPSIBLE COLANDER

CROSS REFERENCE TO RELATED APPLICATION

This application claims the benefit of U.S. provisional patent application Ser. No. 61/599,405, filed Feb. 15, 2012, and entitled "Collapsible Collander."

TECHNICAL FIELD

The present invention relates to cooking utensils. More specifically, a collapsible colander is provided.

BACKGROUND INFORMATION

A colander is a container, which is typically shaped like a bowl, having a perforated bottom for draining and straining foods. Colanders are commonly used for washing fruits and vegetables, draining water from foods that are cooked in water, etc. A typical colander is bulky, requiring significant cabinet space for storage, and taking up significant space in a dishwasher while being cleaned. For this reason, various folding and/or collapsible colanders have been proposed.

One example is U.S. Pat. No. 7,678,271, disclosing a collapsible colander, bowl, and funnel. The device includes a rigid rim, a rigid base, and a sidewall. The sidewall includes first and second folding sections (living hinges) that allow the device to collapse to one third of its expanded height. The device is also disclosed within U.S. D595,997 and US 2008/0230462.

A similar device is described within U.S. Pat. No. 8,215,230, which discloses a collapsible salad spinner having an external bowl and internal basket. The bowl and basket each have rigid bases and rims separated by flexible central sections. The central sections each define upper and lower living hinges. The location of the living hinges is such that the bowl and basket may be collapsed together when the bowl is within the basket.

U.S. Pat. No. 4,138,939 discloses a vegetable steamer with a base and a plurality of overlapping, hingedly secured leaves forming the sides. The base includes a pair of straps. A handle includes a pair of legs that are held resiliently outward, ending in tabs that fit under the straps. Pushing the legs together allows insertion or removal of the handle.

U.S. D316,505 shows an adjustable colander. The sides are made from overlapping leaves that are hingedly secured to the base. A central handle is provided.

U.S. Pat. No. 6,019,244 discloses a fabric bowl having a flexible ring around the bottom, and a drawstring around the top. The side walls taper inward towards the top. The bowl is held open by water pressure against the sides when the bowl is used to hold water. The drawstring, along with hook and loop fasteners, are used to hold the bowl in a collapsed configuration for storage or transportation. This device would be unsuitable as a colander, because it requires the internal pressure supplied by its contents in order to remain open. It would therefore not remain open, for example, during the pouring of cooked spaghetti.

U.S. D661,944 discloses a Lotus steamer. The steamer has a base with a plurality of legs and the central handle. The sides are formed from hingedly attached leaves that overlap. The leaves may be placed in an open position, or a closed position wherein they are folded inward to contact the handle.

Prior collapsible colanders only collapsed to a limited extent, requiring a significant amount of space even in their collapsed form. Those that do collapse to a very compact structure are too limited in their rigidity to work effectively as colanders. Accordingly, there is a need for a collapsible colander that collapses into a more compact structure. There is a further need for a collapsible colander having a rigid structure when expanded. There is an additional need for a collapsible colander that limits its reliance on structures that are subject to wear in order to collapse.

SUMMARY

The above needs are met by a collapsible colander. The colander has a body having a plurality of panels including a pair of end panels and at least one central panel. Each of the panels defines an inner end and an outer edge. Each of the panels further defines a fastener guide in close proximity to the outer edge. Each of the panels is pivotally fastened to all other panels by a pivot disposed adjacent to the inner end. The central panel or panels are fastened to two adjacent panels by fasteners that are slidably retained within the fastener guides defined within the adjacent panels. Similarly, each of the end panels is fastened to one adjacent central panel by a fastener that is slidably retained within the fastener guides defined within the adjacent panels. The end panels define an angular gap therebetween. Each end panel has a releasable fastening component that is structured to releasably secure to the releasable fastening component of the other end panel. This configuration permits the panels to move between a collapsed position wherein the panels overlay each other, and an expanded position wherein the panels form a generally circular structure. From the expanded position, fastening the releasable fastening components causes the collapsible colander to assume a generally bowl-shaped configuration.

These and other aspects of the colander will become more apparent through the following description and drawings.

BRIEF DESCRIPTION OF THE DRAWINGS

Like reference characters denote like elements throughout the drawings.

DETAILED DESCRIPTION

Figure 1:
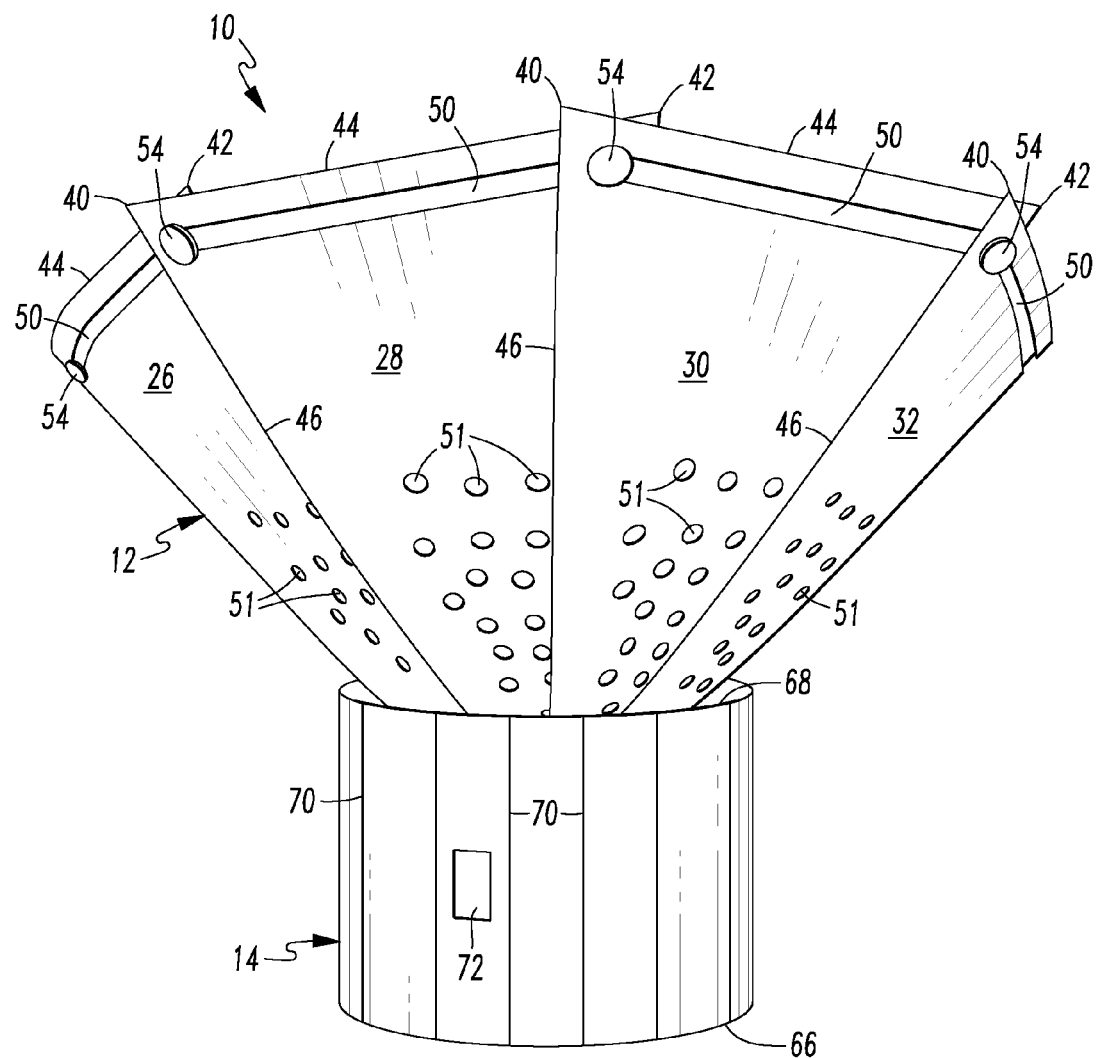
FIG. 1 is a perspective view of a collapsible colander, showing the colander in its assembled configuration.
Figure 2:
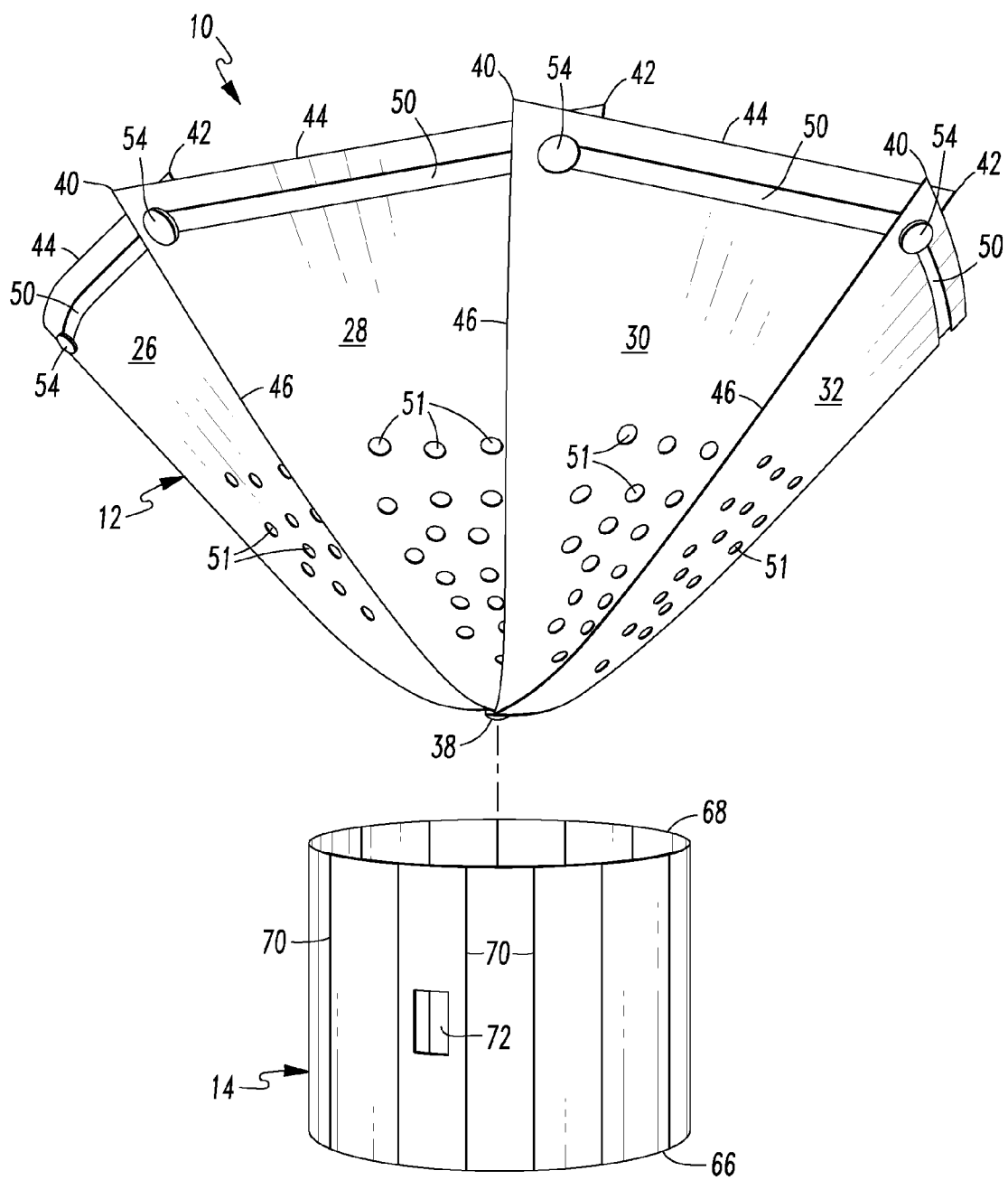
FIG. 2 is a partially exploded perspective view of the colander of FIG. 1.

Referring to the drawings, a collapsible colander 10 is illustrated. As shown in FIGS. 1-2, the colander 10 includes a bowl 12 and a base or sleeve 14. FIGS. 1-2 illustrate the bowl 12 in its assembled configuration and the base 14 in its expanded configuration. In this configuration, the bowl 12 may sit on top of the base 14, and may contain food therein.

Figure 3:
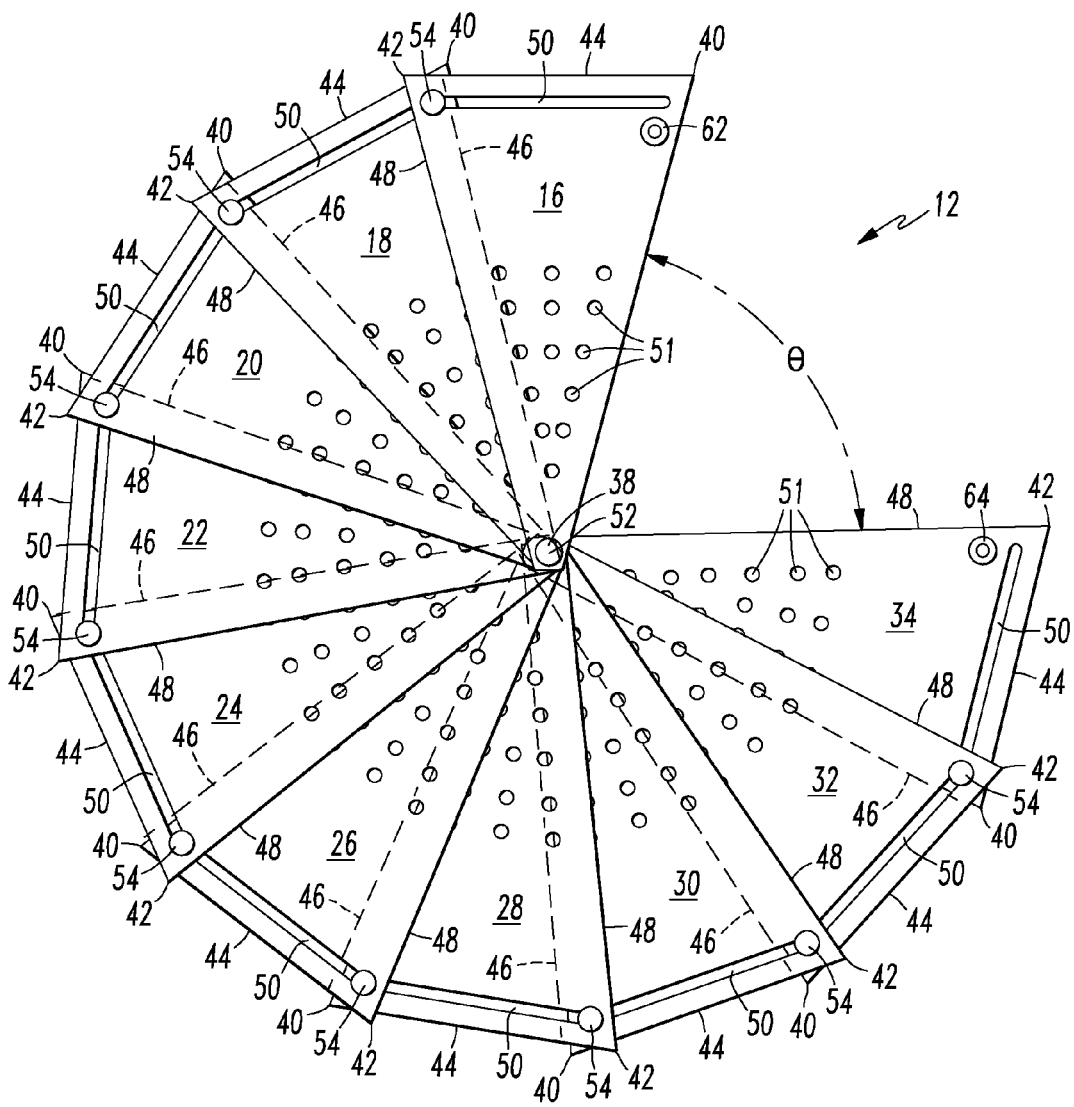
FIG. 3 is a top plan view of the colander of FIG. 1 in its expanded, unassembled configuration.

The details of the bowl 12 are best seen in FIG. 3, illustrating the bowl 12 in its expanded, unassembled configuration. The bowl 12 is made from a plurality of panels, with panels 16, 18, 20, 22, 24, 26, 28, 30, 32, and 34 being illustrated. A smaller or larger number of panels could be selected without departing from the scope of the invention. The illustrated examples of the panels 16, 18, 20, 22, 24, 26, 28, 30, 32, and 34 are tapered, with a wide outer portion adjacent to the outer edge 44, and a narrow inner portion adjacent to the inner corner 38. The illustrated panels 16, 18, 20, 22, 24, 26, 28, 30, 32, and 34 are generally triangular in shape. Panels 16, 34 are end panels, while panels 18, 20, 22, 24, 26, 28, 30, and 32 are central panels. The bowl 12 includes at least two end panels, and at least one central panel. Some examples of the panels 18, 20, 22, 24, 26, 28, 30, and 32 have substantially the same dimensions. Because the illustrated examples of the panels 16, 18, 20, 22, 24, 26, 28, 30, 32, and 34 are generally structurally identical, with only a few exceptions, panel components herein will be referred to by the same reference character. Each of the panels 16, 18, 20, 22, 24, 26, 28, 30, 32, and 34 includes an inner corner (or end) 38, a pair of (optional) outer corners 40, 42, an outer edge 44, and a pair of side edges 46, 48. In the illustrated example, the side edges 46, 48 are substantially equal in length, and are longer than the outer edge 44.

A fastener guide 50 is defined within each panel 16, 18, 20, 22, 24, 26, 28, 30, 32, and 34, extending from a location adjacent to the edge 46 to a location adjacent to the edge 48, and in close proximity to the outer edge 44. In the illustrated example, the fastener guide 50 is in the form of a slot. Although the illustrated example of the fastener guide 50 is substantially straight, some fastener guides 50 may be curved, with some examples of the curve generally corresponding to a circle having a radius equal to the distance from the pivot 52 (described below) to the fastener guide 50. The panels 16, 18, 20, 22, 24, 26, 28, 30, 32, and 34 are perforated in a manner that is well known in the art of colanders, with perforations 51 being illustrated.

Referring to FIGS. 3-7. The individual panels 16, 18, 20, 22, 24, 26, 28, 30, 32, and 34 are joined together by a central pivot 52 passing through apertures defined in close proximity to each inner corner 38 of each panel 16, 18, 20, 22, 24, 26, 28, 30, 32, and 34. Additionally, the fastener guide 50 of each central panel 18, 20, 22, 24, 26, 28, 30, and 32 is slidably connected to the fastener guides 50 of the two adjacent panels. Similarly, the fastener guides 50 of each of the end panels 16, 34 are slidably connected to one adjacent central panel 18, 32. The edges 46, 48 of adjacent panels overlap in the illustrated example. So that the bowl 12 can be bent into a bowl shape as described below, there is an angular gap between the edge 46 of the panel 16, and the edge 48 of the panel 34. The angle θ between the edge 46 of panel 16 and the edge 48 of panel 34 may be selected according to the desired depth of the bowl 12, with a greater angle θ resulting in a deeper depth. The angle θ may, for example, between about 15° and about 150°. Other examples of this angle θ may be between about 30° and about 120°. Still other examples may define an angle θ between about 45° and about 90°.

Figure 4:
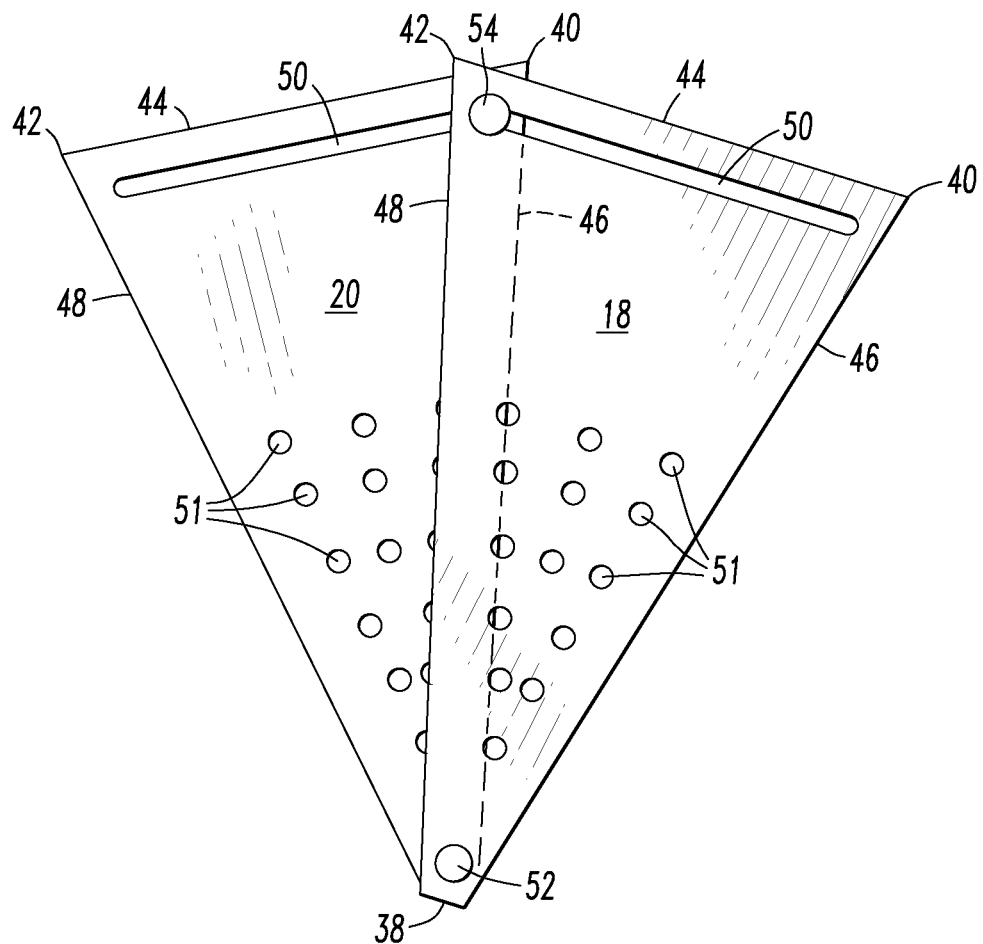
FIG. 4 is a top plan view of a pair of adjacent sections of a colander of FIG. 1.
Figure 5:
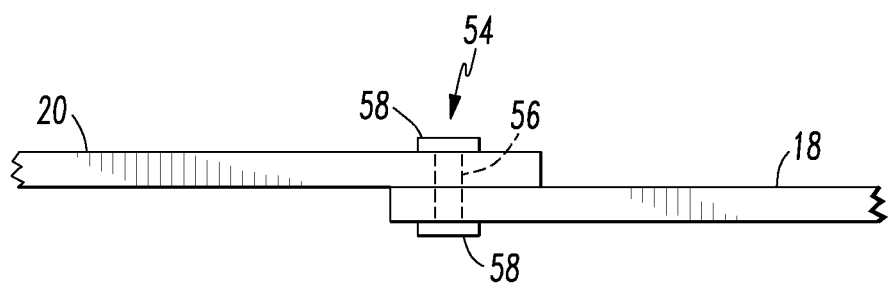
FIG. 5 is a side view of a fastener for a pair of adjacent colander sections of FIG. 4.

One method of slidably connecting the fastener guides 50 of adjacent panels 16, 18, 20, 22, 24, 26, 28, 30, 32, and 34 is illustrated in FIGS. 4-5. A sliding fastener 54 includes a narrow central portion 56 between a pair of wide end portions 58. Although the illustrated example of the sliding fastener 54 is round, other shapes, such as a square or rectangular, may be selected. The narrow portion 56 of the fastener 54 fits within the slots 50 of two adjacent panels 16, 18, 20, 22, 24, 26, 28, 30, 32, and 34, (for example, the illustrated panels 18, 20 of FIG. 4) with the wide portions 56 retaining the fastener 54 within the slots 50. Adjacent panels 16, 18, 20, 22, 24, 26, 28, 30, 32, and 34 are thereby permitted to slide with respect to each other as they pivot around the pivot 52.

Figure 6:
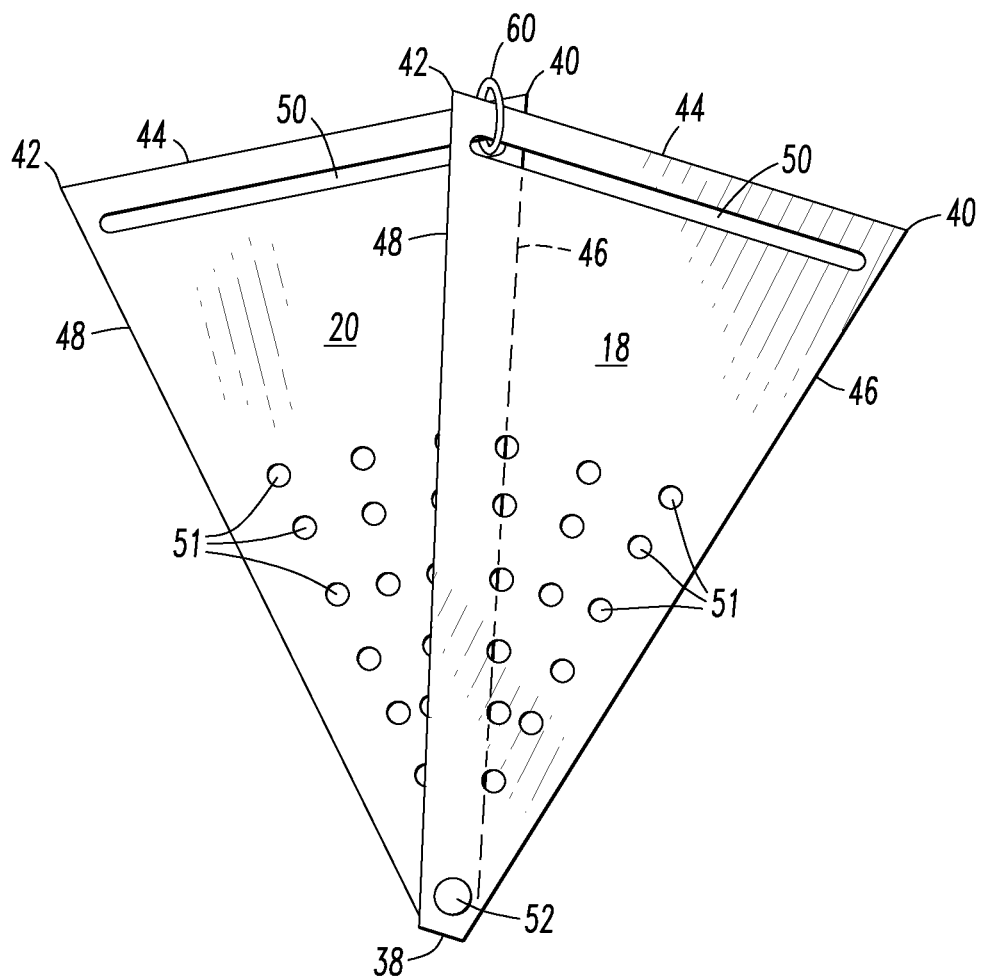
FIG. 6 is a top plan view of a pair of adjacent sections of a colander of FIG. 1.
Figure 7:
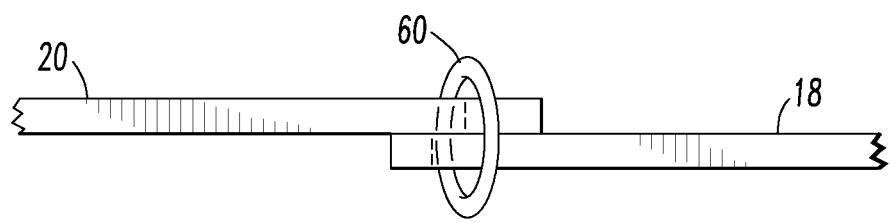
FIG. 7 is a side elevational view of a pair of adjacent sections of a colander of FIG. 1, showing an alternative fastener.

Another method of slidably connecting the fastener guides 50 of adjacent panels 16, 18, 20, 22, 24, 26, 28, 30, 32, and 34 is illustrated in FIGS. 6-7. A ring 60 fits within the slots 50 of two adjacent panels 16, 18, 20, 22, 24, 26, 28, 30, 32, and 34, (for example, the illustrated panels 18, 20 of FIG. 6). Adjacent panels 16, 18, 20, 22, 24, 26, 28, 30, 32, and 34 are thereby permitted to slide with respect to each other as they pivot around the pivot 52.

Referring back to FIG. 3, each of the end panels 16, 34 includes one of a pair of mating fastener components 62, 64. In the illustrated example, one of the end panels 16, 34 includes female snap component 62, and the other of the end panels 16, 34 includes the male snap component 64. Other mating fastener components could be used, for example, hook and loop fasteners, or interlocking mushroom shaped fasteners of the type marketed under the trademark DUAL LOCK by 3M, located in St. Paul, Minn.

Figure 8:
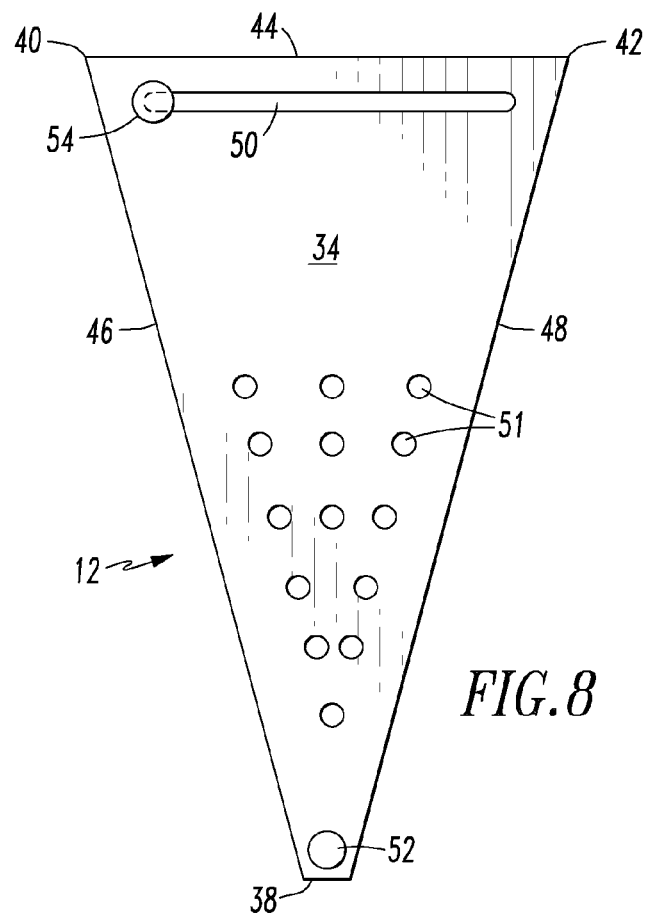
FIG. 8 is a top plan view of a collapsible colander of FIG. 1, showing the colander in a collapsed configuration.
Figure 9:
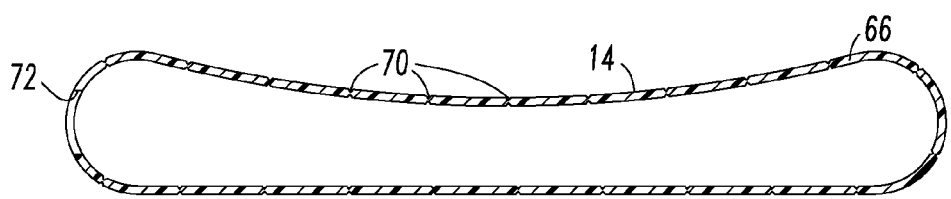
FIG. 9 is a perspective view of a sheath for a collapsible colander of FIG. 1.

The above-described structure for the bowl 12 permits it to be placed in a collapsed configuration of FIG. 8, an expanded configuration of FIG. 3, and an assembled configuration of FIGS. 1-2. With the mating fastener components 62, 64 unfastened, the panels 16, 18, 20, 22, 24, 26, 28, 30, 32, and 34 may be slid with respect to each other so that they overlap each other, forming a very compact package for storage, as shown in FIG. 8. Sliding the panels 16, 18, 20, 22, 24, 26, 28, 30, 32, and 34 with respect to each other permits them to move between the collapsed configuration of FIG. 8 and the expanded configuration of FIG. 3, which serves as an intermediate assembly step as well as a convenient configuration for cleaning the bowl 12. From the expanded configuration of FIG. 3, bending the bowl 12 into a bowl shaped configuration, and then fastening the mating fastener components 62, 64 together, produces the assembled configuration of FIGS. 1-2. Unfastening the mating fastener components 62, 64 permits the previously assembled bowl 12 to be moved through its expanded configuration and into its collapsed configuration for storage.

Figure 10:
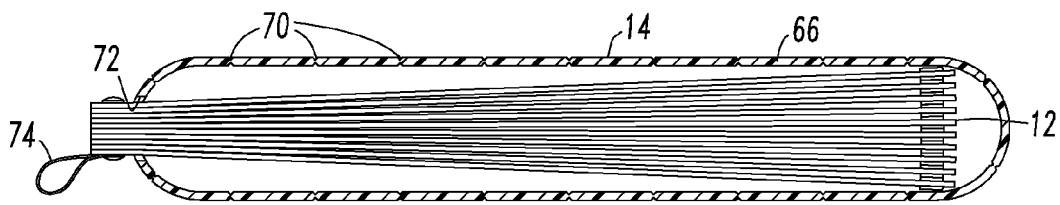
FIG. 10 is a perspective view of a collapsible colander of FIG. 1, showing the colander in a collapsed configuration within the sheath.

The base 14, which can also be configured to be a sheath, is best illustrated in FIGS. 1-2 and 9-10. The base 14 is a continuous band having a pair of edges 66, 68, with a substantially constant width therebetween. The base 14 has suitable dimensions so that the bowl 12 fits within the base 14 for storage when the bowl 12 is in its collapsed configuration, as shown in FIG. 10. A slot 72 may be provided within the base 14, permitting the corner 38 to protrude through the slot 72. Some examples of the bowl 12 may include a strap 74 secured to the corner 38 and/or pivot 52, so that when the corner 38 protrudes through the slot 72, the strap 74 is also outside the base 14. In this configuration, the collapsed colander 10 may be hung from a convenient storage location. When the bowl 12 is in its assembled configuration, the base 14 may be positioned with one of its edges 66, 68 on a table, countertop, or other horizontal surface, in a substantially circular configuration. With the base 14 in this configuration, the bowl 12 may be placed atop the other edge 66, 68, so that the base 14 supports the bowl 12 as shown in FIGS. 1-2. With the bowl 12 and base 14 so assembled, the collapsible colander 10 may be used to strain or drain food. The overlap of the edges 46, 48 of adjacent panels is sufficient to retain the food contained within the colander 10, but may allow liquid to drain between the edges 46, 48 of adjacent panels.

The bowl 12 and base 14 may be made from any material having a suitable combination of strength, rigidity, and flexibility. The bowl 12 must have sufficient strength to hold a reasonable quantity of food, for example, an amount of spaghetti that would be used to feed a typical family. At the same time, the bowl 12 must have sufficient flexibility to transition between its expanded configuration and its assembled configuration. Similarly, the base 14 must have sufficient strength to support the bowl 12 and any food therein while in use. At the same time, the base must have sufficient flexibility to transition from a substantially circular configuration in which it supports the assembled bowl 12 to a substantially flattened configuration wherein it contains the collapsed bowl 12. Toward this end, the base 14 may have hinges, such as living hinges 70, disposed around its periphery. Various polymers commonly used for kitchen utensils may be used to construct the bowl 12 and base 14, with presently available dishwasher safe and/or microwave-safe polymers being preferred. Metals such as stainless steel or aluminum may also be utilized, provided that the metals are configured to meet the above-described functional requirements. As another alternative, the individual panels 16, 18, 20, 22, 24, 26, 28, 30, 32, and 34 of the bowl 12 may be made from flexible mesh screening with a flexible wireframe forming the edges.

An improved collapsible colander is therefore provided. The collapsible colander collapses to a significantly more compact structure than other collapsible colanders, thereby requiring less storage space, as well as less space in a dishwasher. Despite its ability to collapse, the colander has sufficient rigidity to perform the functions of a colander when assembled.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:

1. A collapsible colander, comprising:
a body having a plurality of flexible panels including a pair of end panels and at least one central panel, each of the panels defining an inner end and an outer edge, each of the panels further defining a fastener guide in close proximity to the outer edge, each of the panels being pivotally fastened to all other panels by a pivot disposed adjacent to the inner end, the at least one central panel being fastened to two adjacent panels by fasteners that are slidably retained within the fastener guides defined within adjacent panels, each of the end panels being fastened to one adjacent central panel by a fastener that is slidably retained within the fastener guides defined within adjacent panels, the end panels defining an angular gap therebetween, each end panel having a releasable fastening component that is structured to releasably secure to the releasable fastening component of the other end panel;
whereby the panels may move between a collapsed position wherein each of the panels has a substantially planar configuration and wherein the panels overlay each other and an expanded position wherein the panels form a generally circular structure, and fastening the releasable fastening components causes the collapsible colander to assume a generally bowl-shaped configuration.

2. The collapsible colander of claim 1, wherein an angle between the end panels is between about 15° and about 150°.

3. The collapsible colander of claim 1, wherein an angle between the end panels is between about 30° and about 120°.

4. The collapsible colander of claim 1, wherein an angle between the end panels is between about 45° and about 90°.

5. The collapsible colander of claim 1, wherein the releasable fasteners are selected from the group consisting of male and female snap components, hook and loop fasteners, and interlocking mushroom-shaped fasteners.

6. The collapsible colander of claim 1, further comprising a sleeve structured to receive the body when the body is in a collapsed configuration.

7. The collapsible colander of claim 1, further comprising a base structured to support the body when the body is in an assembled configuration.

8. The collapsible colander of claim 1, further comprising a sleeve structured to receive the body when the body is in a collapsed configuration, and to support the body when the body is in an assembled configuration.

9. The collapsible colander of claim 1, wherein the fastener guides are slots defined within each panel.

10. The collapsible colander of claim 1, wherein the fastener includes a central portion and a pair of end portions, the central portion being retained within the slots defined within two adjacent panels, the end portions having a width that is larger than a width of the slots.

11. The collapsible colander of claim 1, wherein the fastener is a ring passing through the slots defined within two adjacent panels.

12. The collapsible colander of claim 1, wherein the panels are tapered, with the outer edge of each panel having a length that is longer than a length of the inner edge of the panel.

* * * * *